United States Patent [19]

Minns, Jr.

[11] 3,870,065
[45] Mar. 11, 1975

[54] MEASURING SYSTEM
[76] Inventor: H. Gordon Minns, Jr., Rt. 11, P.O. Box 91B, Morgantown, W. Va. 26505
[22] Filed: Aug. 6, 1973
[21] Appl. No.: 385,642

[52] U.S. Cl. .................................. 137/93, 137/5
[51] Int. Cl. ........................................ G05d 11/13
[58] Field of Search ................... 137/3, 5, 88, 93

[56] References Cited
UNITED STATES PATENTS
2,927,501  3/1960  Busignies et al. ................ 137/3

*Primary Examiner*—Alan Cohan
*Assistant Examiner*—Gerald A. Michalsky

[57] ABSTRACT

Disclosed is a measuring and proportioning system for mixing biological fluids. A blood sample having an ion or other component concentration is passed through a sensor to produce a corresponding electrical output which is stored in a track and hold circuit. The sensor is then coupled to a pair of intravenous fluid reservoirs and the flow from the reserviors through the sensor detected and controlled by a servo amplifier to produce an intravenous fluid having the same component concentration. The servo amplifier output is a direct indication of the component concentration in the original blood sample and is substantially independent of long-term sensor drift.

17 Claims, 11 Drawing Figures

MEASURING SYSTEM

This invention relates to an electrical servo amplifier system for measuring and mixing fluids and more particularly is directed to a device for measuring and mixing biological fluids. It is specifically described in conjunction with the mixing of an intravenous fluid for injection into the blood stream of a human being.

Fluid measuring and mixing devices are well known but in most instances are not well suited to the measurement and mixing of biological fluids. Devices are known for the measurement of various human blood components and for example devices using special electrodes have been proposed for the measurement of blood PH, PO2, PCO2, Na+, K+, and CL−. However, in all of these devices the sensing electrodes must be precalibrated and give readings which are subject to errors caused by base line drift, changes in sensitivity and temperature fluctuations.

Within the medical community there is increasing interest in the use of automated devices for patient care, particularly in acute care situations. In light of this, there have been efforts to devise a system which can (1) automatically measure the parameters, (2) compute a program of treatment, (3) institute treatment. To date, none of the known systems have been completely successful. This is largely due to the fact that the sensing electrodes of the systems for long-term continuous patient monitoring cannot be trusted to give accurate readings without continual attention and recalibration.

The present system overcomes these problems by providing an electrical servo amplifier system for measuring and/or mixing biological fluids which eliminates the ill effects of drift and changing sensitivity. This system together with conventional computing and other hardware makes it possible to administer the proper fluids and electrolytes for those patients who require frequent clinical reevaluation for their acute illness.

In the present invention a sample of the biological fluid to be measured such as a human blood sample is passed through a conventional sensor such as one comprising a Na+ ion-selective electrode which is subject to electrode drift. Rather than relying upon electrode stability and precalibration the output of the sensor is followed by an electrical track and hold circuit. The sensor concentration is then compared with the output of the same sensor through which is passed a fluid having a similar component concentration such as an intravenous fluid to be injected into the human being from which the blood sample was taken. Differences between the blood sample concentration and the intravenous fluid concentration produce an output from a servo amplifier which is indicative of the component concentration in the original blood sample and which is used in a novel mixing arrangement to produce an equal component concentration in the intravenous fluid.

The present system uses the ion-selective electrode as a comparator to determine when a mixture produced by the device has the same concentration of a desired component as the unknown fluid (blood sample) which was admitted to the input of the device. The concentration is then read by observing the action of the proportioning system of the mixer. While described in conjunction with the measurement and mixing of blood sample and intravenous fluids the system of the present application may be used for measuring and mixing a wide variety of both liquids and gases and in addition to blood samples may be used to measure urine and other biological concentrations and may be used to measure and mix gases such as might be required for anesthetic administration to a patient during surgery.

In one embodiment of the present invention the integrated output of the servo amplifier is used to control a pair of proportioning pumps for producing the desired concentration of a blood component in an intravenous fluid. In a second embodiment the servo amplifier output controls the speed of a metering pump in a similar proportioning system. In a third embodiment the flow from a pair of reservoirs is mixed by means of a switched flow system in which the on/off time of the fluid switch is varied in accordance with the desired concentration.

It is therefore one object of the present invention to provide an improved fluid measuring system and method.

Another object of the present invention is to provide an improved device for mixing fluids.

Another object of the present invention is to provide a device for measuring and mixing biological fluids.

Another object of the present invention is to provide an electrical fluid measuring and mixing system and method which is substantially independent of drift in the output of the fluid component sensor.

Another object of the present invention is to provide a fluid measuring and mixing system and method incorporating an ion-selective electrode type fluid sensor which is substantially independent of ion-selective electrode drift.

Another object of the present invention is to provide an improved control system for mixing fluids and particularly biological fluids.

Another object of the present invention is to provide an improved measuring and mixing system in which a component concentration of a first fluid is simulated by the system in a second fluid.

Another object of the present invention is to provide a system for measuring a component concentration in a human blood sample and mixing intravenous fluid so as to have the same component concentration.

Another object of the present invention is to provide an electrical measuring and mixing system in which the first output of a component sensor is compared with a second output of the same sensor in a servo amplifier with the servo amplifier output representing the time integral of the two sensor outputs.

These and further objects and advantages of the invention will be more apparent upon reference to the following specification, claims and appended drawings wherein

Figure 1:
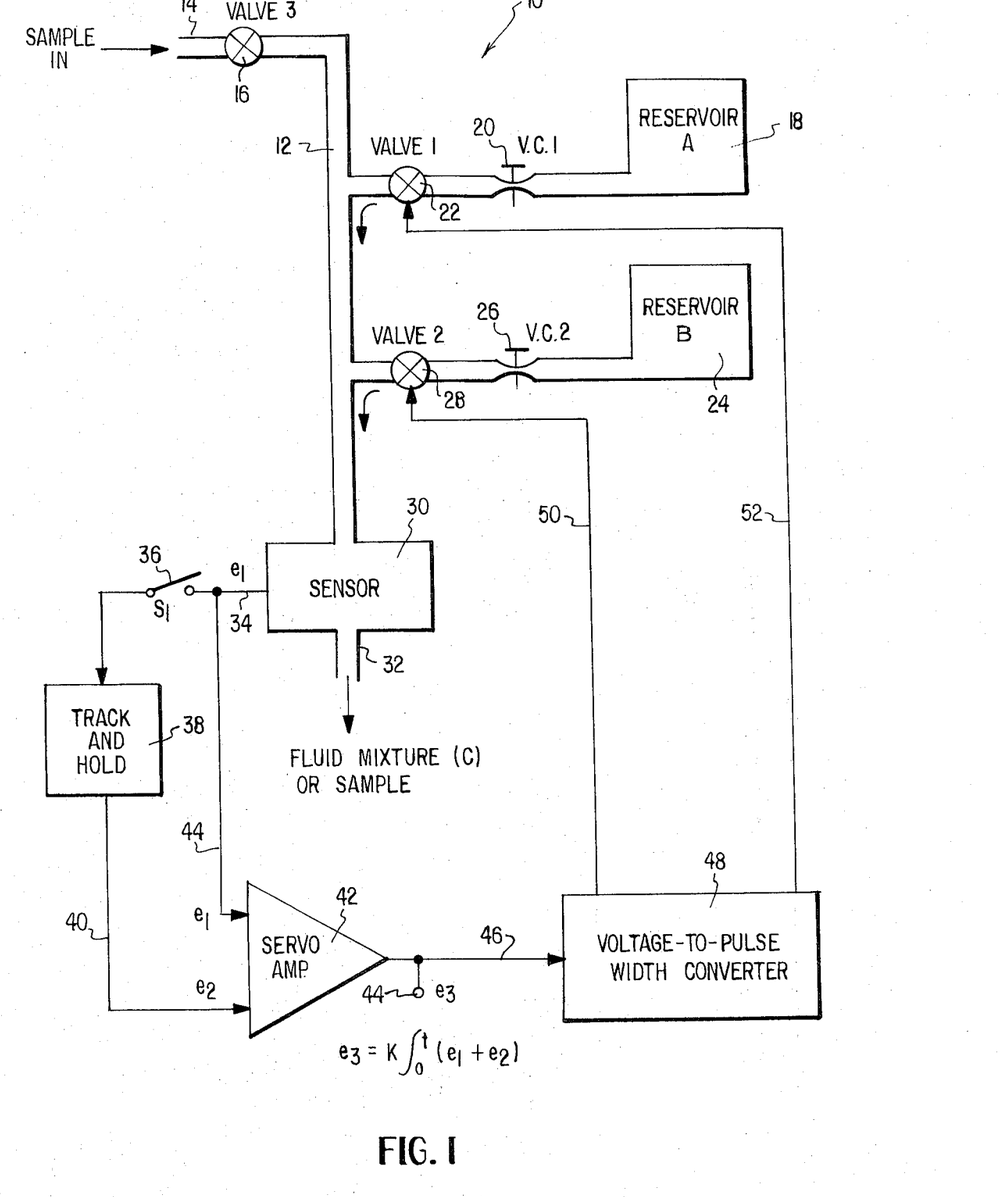
FIG. 1 is a simplified block diagram of the overall measuring and mixing system of the present invention using proportioning valves to mix the fluid components.

Referring to the drawings, FIG. 1 shows a simplified block diagram of a first embodiment of the measuring and mixing system or device of the present invention generally indicated at 10. It comprises a main flow line or conduit 12 having an inlet 14 adapted to receive a sample of the fluid to be measured such as a sample of human blood. Flow of blood through the pipe or conduit 12 is under the control of an inlet valve 16.

Coupled to conduit 12 is a first reservoir 18 labeled reservoir A which by the way of example only, may contain a intravenous fluid having a 5 percent dextrose concentration and which is free of the blood component (such as Na+) to be measured. The fluid or liquid in reservoir 18 is under pressure and is supplied under preferrably a constant pressure to the conduit 12 by way of a variable constriction 20 and a flow control valve 22. Also communicating with conduit 12 is a second reservoir 24 labeled reservoir B, which by way of example only, may contain a concentrated solution of the blood component to be measured (such as Na+). The liquid in reservoir B is preferably also under constant pressure and is supplied to conduit 12 through a second variable restriction 26 and a second flow control valve 28.

The fluid in conduit 12 passes through a sensor 30 and from the sensor to an outlet 32 where it is supplied to a suitable utilization device (not shown) such as an intravenous feeder. Sensor 30 is of conventional construction and by way of example only, may have a plurality of sensing electrodes which sense the ion concentration of the fluid passing through the sensor between the electrodes to produce a voltage output $e_1$ on lead 34 proportional to the Na+ concentration of the fluid passing through sensor 30. The voltage $e_1$ on lead 34 from the sensor is applied through a switch 36 labeled S1 to a track and hold circuit 38 which develops a corresponding voltage output $e_2$ on its output lead 40 which is applied to one input of a servo amplifier 42. The other input of a servo amplifier 42 receives the voltage $e_1$ directly from sensor 30 by way of a lead 44. The Na+ concentration of fluid mixture C is directly proportional to the output voltage $e_3$ from servo amplifier 42 appearing at terminal 44. By attaching a volt meter to output terminal 44 the Na+ concentration of the intravenous fluid and therefore the Na+ concentration of the original blood sample to which it is equal is indicated by the reading of $e_3$ on the volt meter attached to terminal 44.

The output of servo amplifier 42 i.e., $e_3$ is also applied by way of a lead 46 to the input of a voltage-to-pulse width converter 48. This converter produces a pair of control signals on leads 50 and 52 which control the respective flow control valves 28 and 22 to produce the desired Na+ concentration in accordance with the output voltage $e_3$ from servo amplifier 42. Thus, the device of FIG. 1 acts as a measuring device to produce a voltage output at terminal 44 which is indicative of the Na+ concentration of the original blood sample and also produces a fluid mixture C at conduit output 32 which is a mixture of fluids A and B from reservoirs 18 and 24 which has the same Na+ concentration as the original blood sample.

Figure 2:
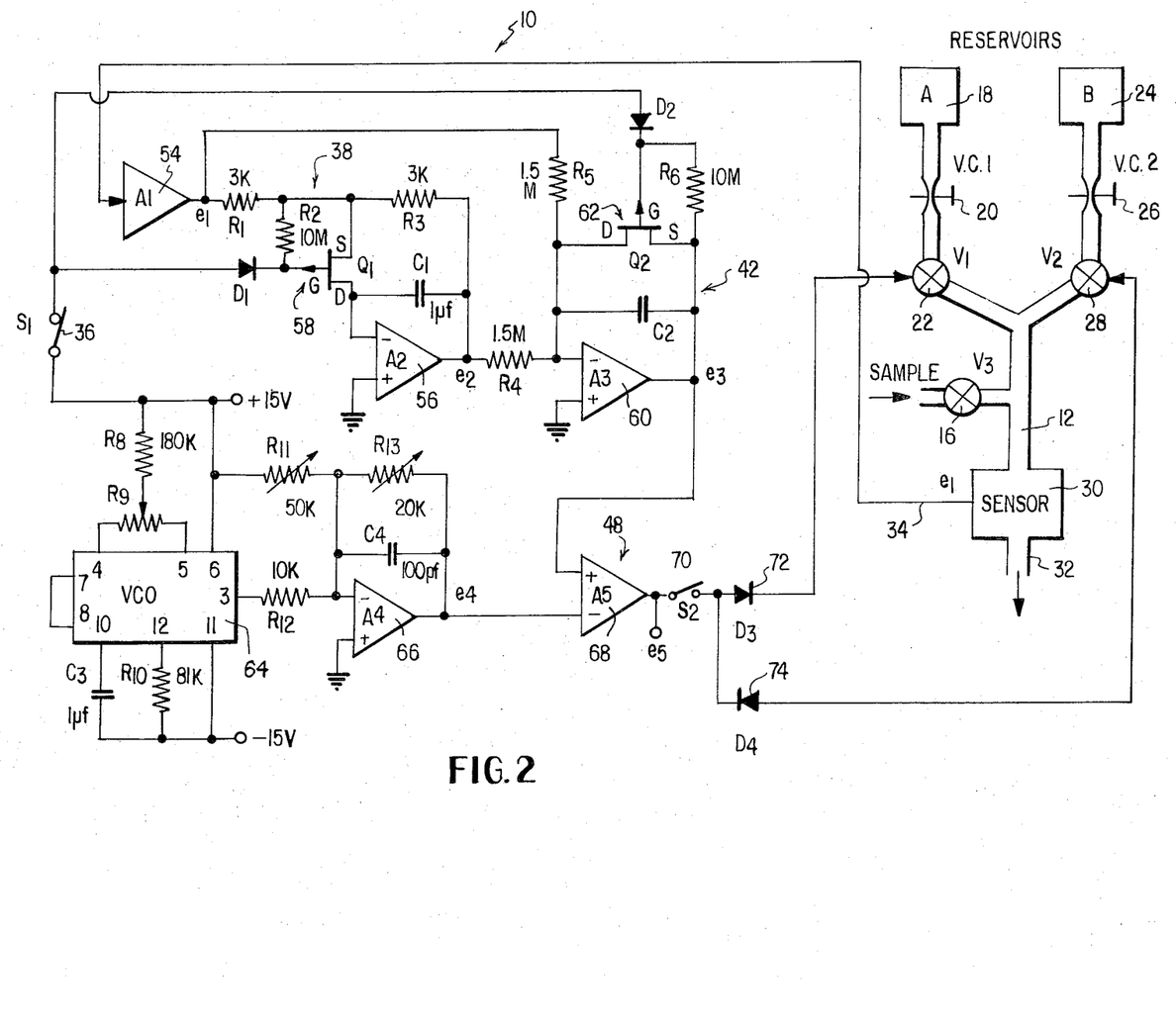
FIG. 2 is a detailed circuit diagram of the system of FIG. 1.

FIG. 2 is a detailed circuit diagram of the system 10 of FIG. 1 in which like parts bear like reference numerals. The output from sensor 30 on lead 34 is applied to amplifier 54 labeled A1 in which the signal from the sensor is amplified and conditioned. From amplifier 54 the signal is applied to the track and hold circuit 38 comprising integrated circuit amplifier labeled A2 and a junction field effect transistor 58 labeled Q1 along with the associated circuitry. The track and hold circuit functions as a short-term memory. When switch 36 (S1) is opened, resistor R2 holds the gate-source voltage of field effect transistor 58 at zero. Thus, transistor 58 becomes a low resistance pathway permitting resistor R1, resistor R3, and amplifier 56 to function as a unity-gain inverting amplifier such that $e_2 = e_1 (-1)$. Capacitor C1 is then charged with a potential difference equal to $e_1$.

When switch 36 is closed, a positive potential is applied through the rectifier diode D1 to the gate of transistor 58, causing the transistor to become a very high resistance pathway which effectively disconnects resistor R1 and resistor R3 from the inverting input of amplifier 56. However, the capacitor C1 continues to hold the charge previously given it so that the voltage $e_2$ continues to appear at the output of the amplifier 56. With switch 36 closed, the voltage $e_2$ is no longer affected by changes in the voltage $e_1$ at the output of sensor 30.

The servo amplifier 42 comprises a further amplifier 60 labeled A3 and a further junction field effect transistor 62 labeled Q2 and the associated circuitry shown. Operational amplifier 60 together with resistor R4, resistor R5 and capacitor C2 in FIG. 2 functions as an integrating servo amplifier according to the following equation:

$$e_3 = K \int_0^t (e_1 + e_2)$$

where the voltages $e_1$, $e_2$ and $e_3$ are indicated in the drawings and $K$ is a constant determined by the parameters of the circuit.

When the switch 36 is open, resistor R6 holds the gate-to-source voltage of transistor 62 at zero, causing the transistor to become a low-resistance which prevents the capacitor C2 from accumulating charge (i.e., the integrated output voltage $e_3$ is reset to zero.)

When switch 36 is closed, a positive potential is applied through rectifier diode D2 to the gate of transistor 62, causing transistor 62 to become a very high-resistance and allowing capacitor C2 to accumulate charge (i.e., the circuit begins to integrate $e_1$ and $e_2$). The result of the integration is a slowly rising potential $e_3$ at the output of amplifier 60 which stops increasing when $e_1 = -e_2$.

The voltage-to-pulse width converter 48 comprises a voltage controlled oscillator 64, and two amplifiers 66 and 68 labeled A4 and A5 respectively. The purpose of this part of the circuit is to generate valve control pulses such that the average "on" time of valve 22 relative to valve 28 is a linear function of the integrator output $e_3$. Voltage controlled oscillator 64 is an integrated circuit triangular wave generator such as an Intersil 8038 whose frequency is set to approximately 1 Hz by resistor R8, resistor R9 and capacitor C3. Resistor R10 is necessary for proper operation of the oscillator. The triangular waveform at pin 3 of the oscillator 64 is connected to the inverting input of amplifier 66. The DC level and the amplitude of the triangular waveform are adjusted by resistors R11 and R13 respectively. The waveform $e_4$ at the output of amplifier 66 is a symmetrical triangle whose peak value is −10 volts and whose minimum value is 0 volts. Capacitor C4 stabilizes the amplifier.

Amplifier 68 functions as a comparator whose output $e_5$ is +12 volts when $e_3$ is greater than $e_4$ and whose output is −12 volts when $e_3$ is less than $e_4$. The output of amplifier 68 is connected through a switch 70 labeled S2 in turn connected by respective rectifier diodes 72 and 74 to the flow control valves 22 and 28. When switch 70 is closed the voltage $e_5$ is connected to the diodes. When $e_5$ is positive, diode 72 conducts and electric flow control valve 22 is opened, permitting fluid from the reservoir 18 to flow into the sensor 30. When $e_5$ is negative, diode 74 conducts, valve 28 is opened, and fluid from reservoir 24 flows into the sensor. The valves 22 and 28 are never opened simultaneously.

Figure 3:
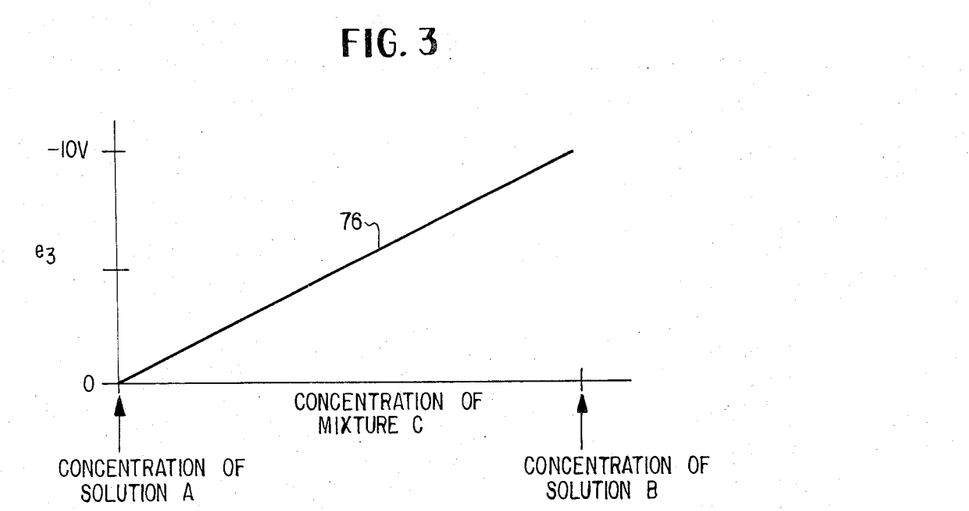
FIG. 3 is a plot of voltage versus mixture concentration for the system of FIGS. 1 and 2.

FIG. 3 is a plot of the concentration of mixture C passing through the sensor 30 as a function of the voltage $e_3$. When $e_3$ is 0 volts the mixture is solely the concentration of solution A from reservoir 18. When voltage $e_3$ reaches a maximum of −10 volts the concentration is solely that of the solution B from the reservoir 24. The straight line function indicated by the straight line 76 in FIG. 3 shows that the voltage $e_3$ is directly proportional to the concentration of the mixture passing through sensor 30.

Figure 4:
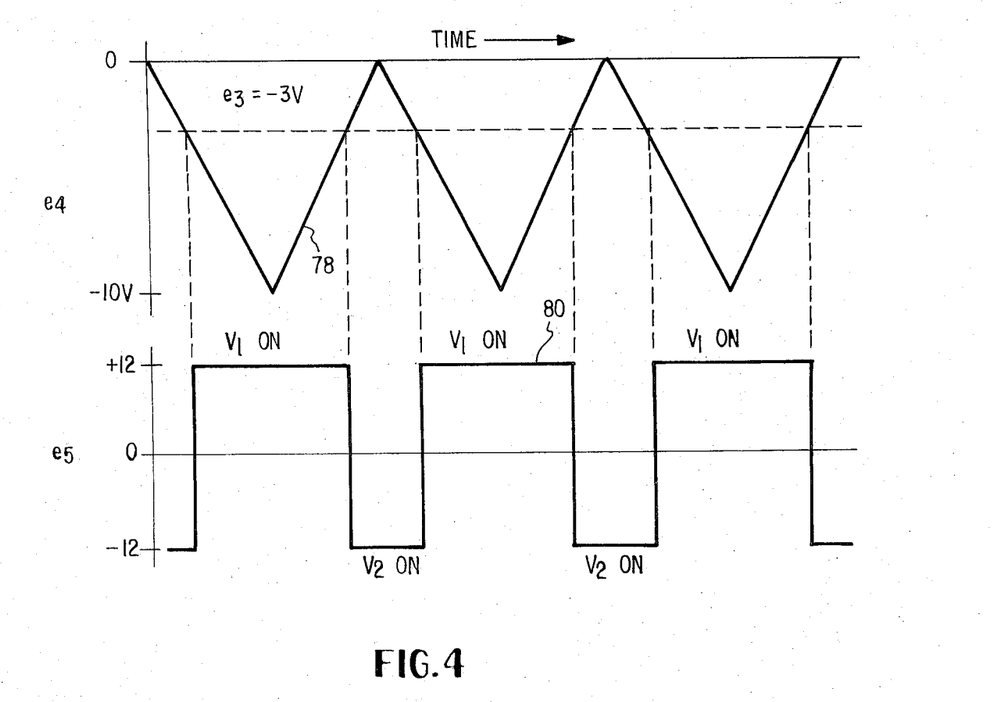
FIG. 4 shows two voltage waveforms in the circuit of FIG. 2 for a first servo amplifier output.

FIG. 4 is a plot of the voltages $e_4$ and $e_5$ as a function of time. These are shown in FIG. 4 for the condition $e_3 = -3$ volts. As can be seen $e_4$ is a triangular waveform 78 having a minimum of 0 volts and a maximum of −10 volts. The rectangular waveform 80 of $e_5$ is determined by the crossover of $e_4$ relative to the steady state potential $e_3 = -3$ volts. For those periods when $e_4$ is more negative than −3 volts, $e_5$ is +12 volts and when it is more positive, $e_5$ is −12 volts.

Figure 5:
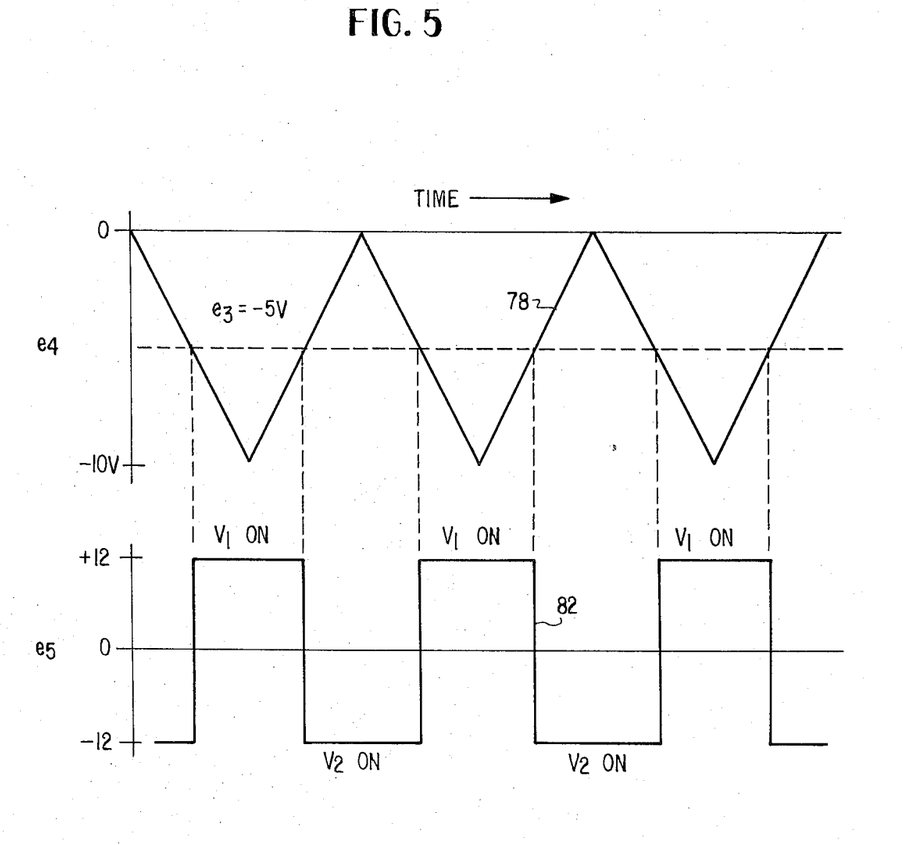
FIG. 5 shows waveforms corresponding to those of FIG. 4 but for a different servo amplifier output.

FIG. 5 is a similar plot of the voltages $e_4$ and $e_5$ for the condition $e_3 = -5$ volts. Voltage $e_4$ is again represented by the triangular waveform 78 but the waveform for $e_5$ is more nearly the square wave 82 with the average on-time or opening of valve 28 almost equal to the on-time or opening time of valve 22 of FIG. 2.

Referring again to FIG. 2, in operation switch 36 is opened, switch 70 (S2) is opened, valves 22 and 28 are closed and sampling valve 16 is opened. A blood sample containing a unknown concentration of the substance to be measured is introduced through valve 16 into sensor 30. The sensor is allowed to equilibrate with the sample so that a stable reading or voltage $e_1$ is obtained. The signal $e_1$ is tracked by the track and hold circuit 38.

Next, switch 36 is closed, switch 70 is closed and then valve 16 is closed. The magnitude of $e_1$ at the instant the switch 36 was closed is stored by the track and hold circuit 38 as $e_2$. Since there is no longer any sample in the sensor 30, $e_1$ is no longer equal to $-e_2$. Hence, the ouput of the servo amplifier begins to change from 0 toward −10 volts. The concentration of the mixture produced by the proportioning valves is a function of $e_3$, and begins to increase accordingly.

Eventually, the concentration of the mixture will increase such that the output $e_1$ from the sensor is identical to the value of $e_1$ that appeared when the unknown sample was in the sensor. Thus $e_1$ now equals $-e_2$ (the stored value of the previous $e_1$) and the output of the servo amplifier ceases to change. The magnitude of $e_3$ stabilizes to whatever potential is needed to produce a fluid mixture containing a concentration exactly like that of the unknown sample. The servo amplifier insures that the concentration of the mixture is identical to the concentration of the unknown sample. Its output ($e_3$) is therefore a measure of the concentration of the unknown sample and is independent of the calibration of the sensor 30 itself.

Figure 6:
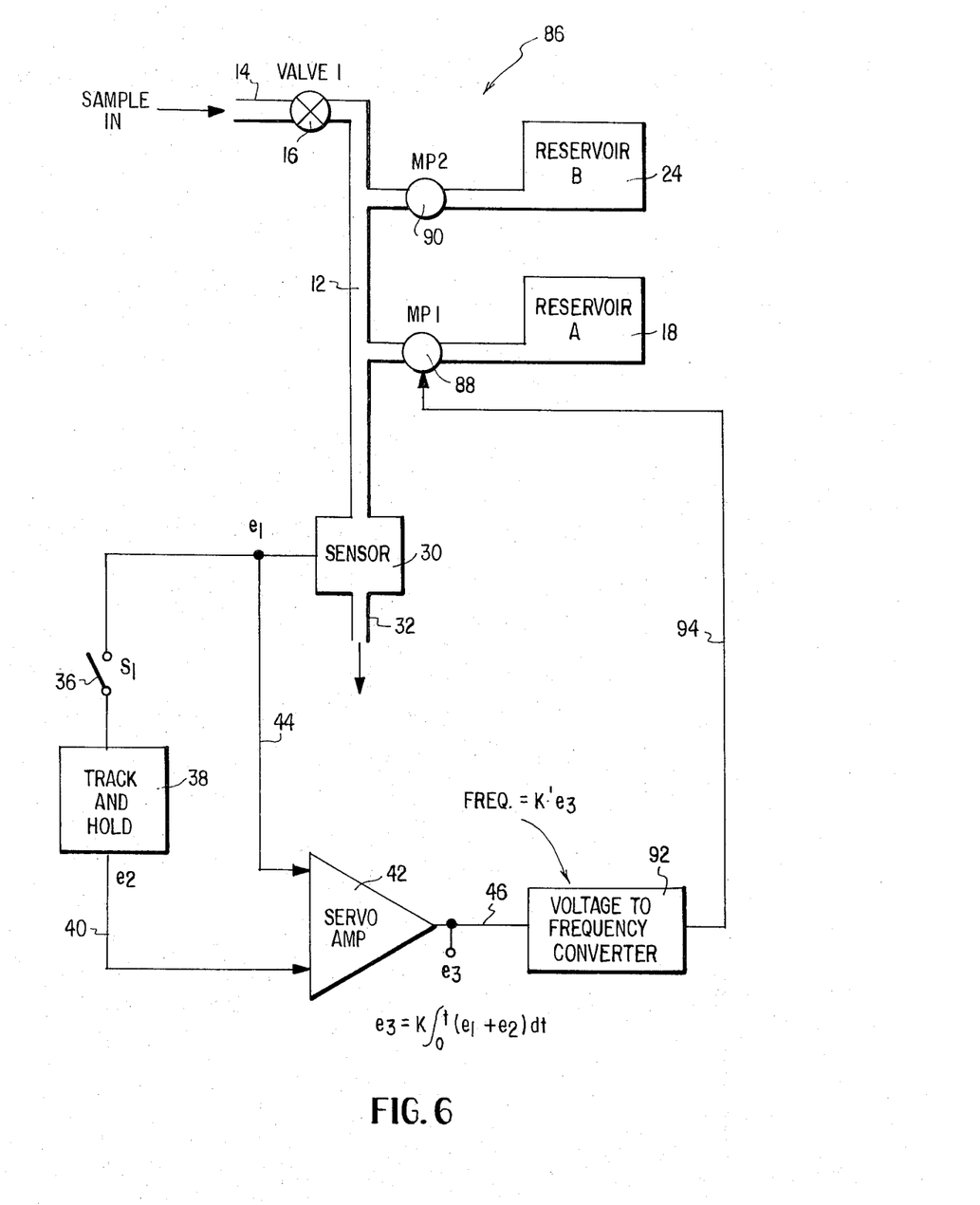
FIG. 6 is a simplified overall block diagram of a modified embodiment of the present invention in which mixing is accomplished by metering pumps.
Figure 7:
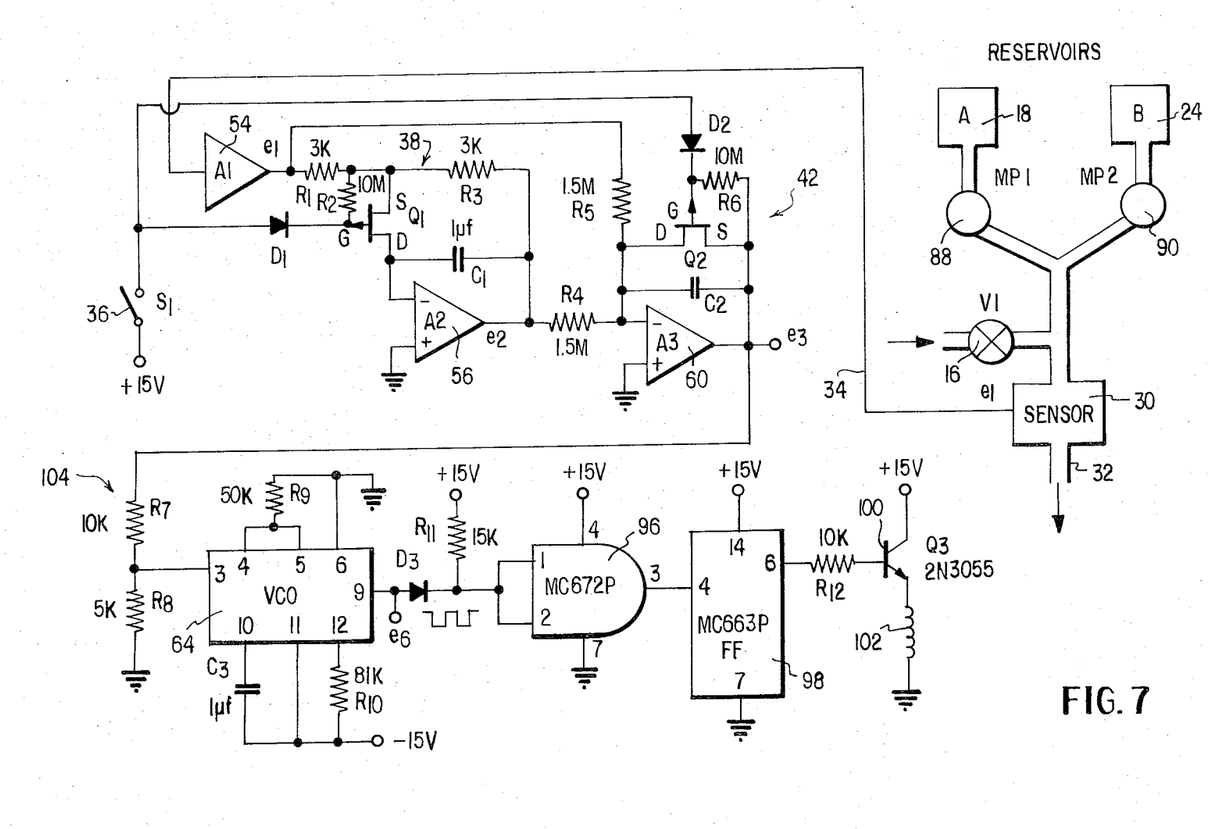
FIG. 7 is a detailed circuit diagram of the embodiment of FIG. 6.

FIG. 6 is a simplified block diagram of a modified measuring and mixing device or system constructed in accordance with the present invention. FIG. 7 is a detailed circuit diagram of the modified embodiment of FIG. 6 and in both FIGS. 6 and 7 like parts bear like reference numerals. The modified system 84 of FIG. 6 is similar to the system of FIG. 1 except that the fluids in reservoirs 18 and 20 pass through a pair of metering pumps 88 and 90 to the main flow conduit 12. Metering pump 90 is preferably set to a constant flow rate whereas metering pump 88 is under the control of the output voltage $e_3$ from servo amplifier 42 by way of a voltage to frequency converter 92 and lead 94.

FIG. 7 shows a detailed circuit diagram of the system of FIG. 6 and the amplifier 54, track and hold circuit 38, and servo amplifier 42 are identical to the previous embodiment. The voltage controlled oscillator 64 in FIG. 7 has a square wave output taken from pin 9 indicated as the voltage $e_6$ which passes through a gate 96 and a flip-flop 98 by way of an NPN junction transistor 100 to the coil 102 of metering pump 88. By way of example only both metering pumps 88 and 90 may be of the type identified as Harvard Apparatus 1300 Series Lambda pump.

In FIG. 7 the voltage $e_3$ from the output of servo amplifier 60 is reduced to a maximum of −3.3 volts by a voltage divider 104 comprising resistors R7 and R8. The resulting signal is fed to the input of the voltage controlled oscillator (Intersil 8038) such that the frequency of oscillation is governed by the magnitude of the voltage $e_3$. The frequency range of the oscillator is determined by resistor R9 and capacitor C3 and is approximately 0.1 to 10 Hz. Resistor R10 is required for proper operation of the VCO. The output of the VCO is a square waveform from pin 9. The waveform is made to vary from 0 to +15 volts by a rectifier diode D3 and the pull-up resistor R11.

The rise time of the waveform is improved by the gate 96 (Motorola MC672P) and is then fed to the input of flip-flop 98 (Motorola MC663P). The frequency of the square wave at the output pin 6 of the flip-flop is one-half of the frequency at the input terminal (pin 4). Current is supplied to the solenoid coil 102 of metering pump 88 by power transistor 100 which by the way of example only may be an RCA 2N3055 through a base resistor R12.

Except for the differences noted the operation of the embodiment of FIGS. 6 and 7 is similar to that previously described with respect to the embodiment of FIG.

1 and as in the previous embodiment the resulting fluid mixture passing through sensor 30 is a linear function of the value of the voltage $e_3$ from the servo amplifier.

Figure 8:
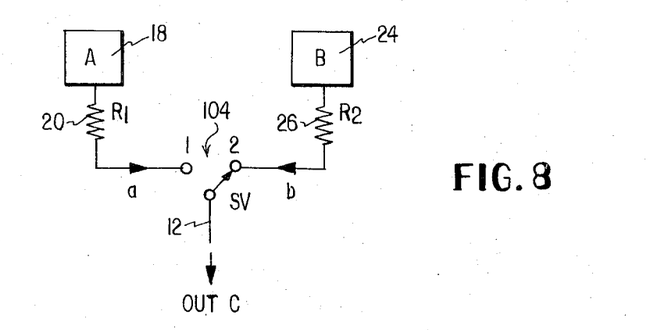
FIG. 8 shows a modified mixing arrangement usable in the system of either FIG. 1 or FIG. 6.

FIG. 8 shows a modified proportioning arrangement usable in the overall system of either FIG. 1 or FIG. 6. In FIG. 8 the two reservoirs 18 and 24 are connected through the variable restrictions 20 and 26 to the main flow conduit 12 by way of a two-position solenoid valve 104 labeled SV. In one position, for example in the energized or "on" position, conduit 12 is connected to reservoir 18. When the solenoid valve 104 is in the unenergized or "off" position illustrated in FIG. 8 flow conduit 12 is connected to the output of reservoir 24.

Figure 9:
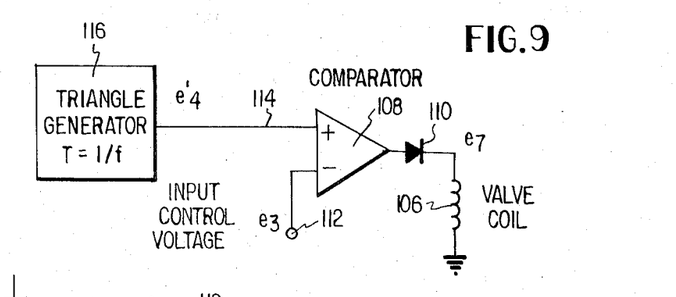
FIG. 9 shows an electrical circuit usable in the mixing arrangement of FIG. 8.
Figure 10:
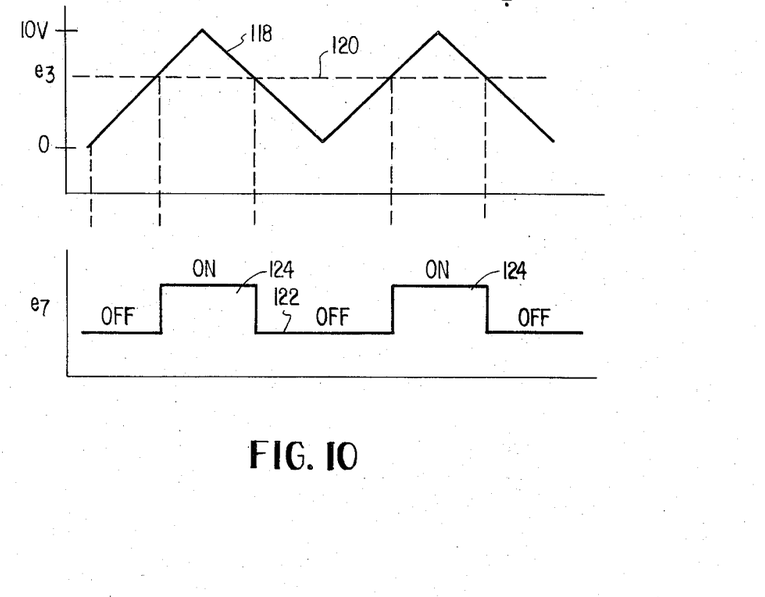
FIG. 10 shows two voltage waveforms explanatory of the mixing system of FIGS. 8 and 9.

FIG. 9 illustrates the electrical circuit for energizing the solenoid valve 104 of FIG. 8. In FIG. 9 the coil 106 of valve 104 is coupled to the output of a comparator 108 by way of a rectifier diode 110. The negative input terminal 112 of comparator 108 is connected to the output or control voltage $e_3$ of the servo amplifier in the embodiment of either FIG. 1 or of FIG. 6. The positive input 114 of comparator 108 is connected to the output $e_4'$ of a triangular wave generator or oscillator 116. Triangular generator 116 may comprise the oscillator 64 and DC level adjuster 66 as illustrated in FIG. 2 to which an invertor is added to give the inverted or positive going triangular voltage waveform 118 illustrated in FIG. 10. The positive potential level of $e_3$ is illustrated in FIG. 10 by the dashed line 120. The crossover points of this waveform with the $e_3$ potential are converted in the comparator 108 to the rectangular waveform 112 ($e_7$) at the output of rectifier diode 110 of FIG. 9. During the "on" periods represented by the pulses 124 solenoid valve 104 of FIG. 8 connects to the output of reservoir 18 and during the intermediate "off" periods when coil 106 is not energized the solenoid valve 104 connects to the fluid output from reservoir 24 of FIG. 8.

Figure 11:
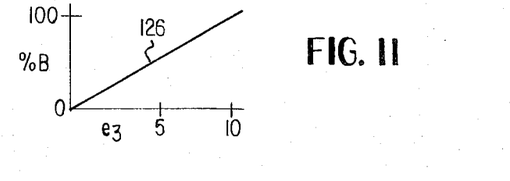
FIG. 11 is a plot of mixture concentration as a function of control voltage for the mixing system of FIGS. 8 and 9.

FIG. 11 is a plot of the percentage of the component concentration from reservoir 24 (reservoir B) of FIG. 8 in the output mixture C of main conduit 12 as a function of the control voltage $e_3$ to comparator 108 of FIG. 9. As can be seen the magnitude of $e_3$ determines the percentage of time the valve 104 samples the output of reservoir B and this is a straight line function as represented by the line 126 of FIG. 11.

It is apparent from the above that the present invention provides an improved and simplified arrangement for both measuring and mixing. For example, an unknown component concentration in a blood sample may be measured by passing it through the sensor 30 and then subsequently obtaining a mixture proportional to the control voltage $e_3$. By connecting a volt meter to the output of servo amplifier 42 the voltage can be measured and this voltage is a direct indication of the measured component in the blood sample. More importantly, the present invention also provides an arrangement for automatically mixing a fluid so that it has the same component combination as the original sample. For example, the NA+ component in a blood sample can be reproduced in the same concentration in an intravenous fluid independent of any drift or fluctuation by the sensor 30. While described in conjunction with a specific example it is apparent that the device of the present invention may be used to mix almost any type of biological fluid including anesthestic gases, and may be used to obtain the desired concentration of various fluid components such as PH, PO2, PCO2, NA+, K+, CL− and others. It may be used to measure the concentration of components in human urine and may if desired be used to measure and/or mix not only biological liquids and gases, but commercial liquids and gases for industrial use as well.

The various component values and integrated circuit types are indicated in the drawings. By way of example only, the amplifiers labeled A1 and A3 may be 741 integrated circuits whereas the amplifiers labeled A2 may be an Analog Devices AD 540.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A system for mixing fluids comprising a sensor for producing an electrical output indicative of a component concentration in a fluid, means coupled to said sensor for supplying a sample fluid to it having a concentration of said component whereby said sensor produces a first electrical output, electrical storage means coupled to said sensor for storing said first output, a pair of fluid reservoirs coupled to said sensor, at least one of said reservoirs being adapted to contain a fluid having a known concentration of said component, proportioning means coupling said reservoirs to said sensor, said sensor producing a second electrical output indicative of the concentration of said component from said reservoirs, and a servo amplifier coupling said sensor and said storage means to said proportioning means for controlling said proportioning means in accordance with said first and second electrical outputs to produce a fluid mixture from said reservoirs having the same concentration of said component as the sample fluid.

2. A system according to claim 1 wherein said proportioning means comprise electrically controlled valves.

3. A system according to claim 1 wherein said proportioning means comprise at least one metering pump coupling said one reservoir to said sensor.

4. A system according to claim 1 wherein said proportioning means comprises a solenoid valve for alternately coupling said sensor to one and the other of said reservoirs.

5. A system according to claim 1 including a meter terminal coupled to the output of said servo amplifier whereby a meter coupled to said terminal gives a direct indication of the concentration of said component in said sample fluid.

6. A system according to claim 1 wherein said servo amplifier has first and second inputs coupled to said respective outputs, said servo amplifier including means for producing a control output representing the time integral of the algebraic sum of the signals at said first and second inputs.

7. A system for mixing biological fluids comprising an electrical concentration sensor for producing an electrical output indicative of a component concentration in a fluid, means coupled to said sensor for supplying a sample fluid to it having a concentration of said component whereby said sensor produces a first electrical output, electrical storage means for storing said first output, a switch coupling said sensor to said electrical storage means, a pair of fluid reservoirs coupled to said sensor, at least one of said reservoirs containing a fluid having a known concentration of said component, proportioning means coupling said reservoirs to said sensor, said sensor producing a second electrical output indicative of the concentration of said component from said reservoirs, and a servo amplifier coupling said sensor and said storage means to said proportioning means, said servo amplifier producing a control signal for said proportioning means equal to the time integral of the difference in magnitude of said first and second electrical outputs.

8. A system according to claim 7 wherein said proportioning means comprises first and second electrically operated valves coupling respective ones of said reservoirs to said sensor, and a voltage-to-pulse width converter coupling said servo amplifier to said valves.

9. A system according to claim 8 wherein said voltage-to-pulse width converter comprises an oscillator and a comparator, said comparator having a first input coupled to said oscillator and a second input coupled to said servo amplifier.

10. A system according to claim 9 wherein said oscillator comprises a triangular wave generator.

11. A system according to claim 7 wherein said proportioning means comprises first and second proportioning pumps coupling respective ones of said reservoirs to said sensor, and a voltage to frequency converter coupling the output of said servo amplifier to one of said metering pumps.

12. A system according to claim 11 wherein said voltage to frequency converter comprises a voltage controlled oscillator, the frequency control terminal of said oscillator being coupled to the output of said servo amplifier.

13. A system according to claim 12 including a voltage divider coupling said servo amplifier to said oscillator.

14. A system according to claim 7 wherein said proportioning means comprises a two-way valve alternately coupling said sensor to first one and then the other of said reservoirs, and means responsive to the output of said servo amplifier for changing the average time said two-way valve is in one position relative to its other position.

15. A system according to claim 14 wherein said means responsive to the output of said servo amplifier comprises a triangular wave generator and a comparator, said comparator having a first input coupled to said generator and a second input coupled to said servo amplifier.

16. A system according to claim 7 wherein said storage means comprises a track and hold circuit.

17. A system according to claim 7 wherein said servo amplifier comprises a differential operational integrator.

* * * * *